United States Patent
Do

[11] Patent Number: 5,226,804
[45] Date of Patent: Jul. 13, 1993

[54] PROPELLER BLADE CONFIGURATION

[75] Inventor: Hung Do, Brossard, Canada

[73] Assignee: General Electric Canada Inc., Mississauga, Canada

[21] Appl. No.: 713,227

[22] Filed: Jun. 11, 1991

[30] Foreign Application Priority Data

Jul. 9, 1990 [CA] Canada .................. 2020765

[51] Int. Cl.⁵ .............................. B63H 1/02
[52] U.S. Cl. .................. 415/906; 416/223 R; 416/DIG. 4
[58] Field of Search ............... 416/223 R, 223 A, 238, 416/203, DIG. 4, 235, 242, 243, DIG. 2, DIG. 5; 415/905, 906, 907, 908; 60/398

[56] References Cited

U.S. PATENT DOCUMENTS

| 1,088,883 | 3/1914 | Donath | 416/223 |
|---|---|---|---|
| 1,123,202 | 12/1914 | Amnelius | 416/235 |
| 1,352,877 | 9/1920 | Cogliolo | 416/238 |
| 1,454,542 | 5/1923 | Grilli | 416/223 |
| 1,613,816 | 1/1927 | Biggs | 416/242 X |
| 1,706,608 | 3/1929 | Holmes | 416/238 |
| 2,754,919 | 7/1956 | Blue | 416/238 |
| 2,859,909 | 11/1958 | Stalker | 416/223 A X |
| 3,442,220 | 5/1969 | Mottram et al. | 416/223 R X |
| 3,972,646 | 8/1976 | Brown et al. | 415/119 X |

FOREIGN PATENT DOCUMENTS

| 304905 | 10/1930 | Canada . | |
| 338493 | 1/1934 | Canada . | |
| 0041493 | 4/1981 | Japan | 416/223 R |
| 0424658 | 2/1935 | United Kingdom | 416/223 R |
| 0511932 | 8/1939 | United Kingdom | 416/223 R |

Primary Examiner—Edward K. Look
Assistant Examiner—Todd Mattingly

[57] ABSTRACT

A propeller type runner is described in which the leading edge of each blade "leans" forward from the root in the direction of rotation to reduce cavitation and increase efficiency. The "lean" provided to each blade of a five blade design is such that the leading edge of each blade obscures a large portion of the trailing edge of the preceding blade.

6 Claims, 3 Drawing Sheets

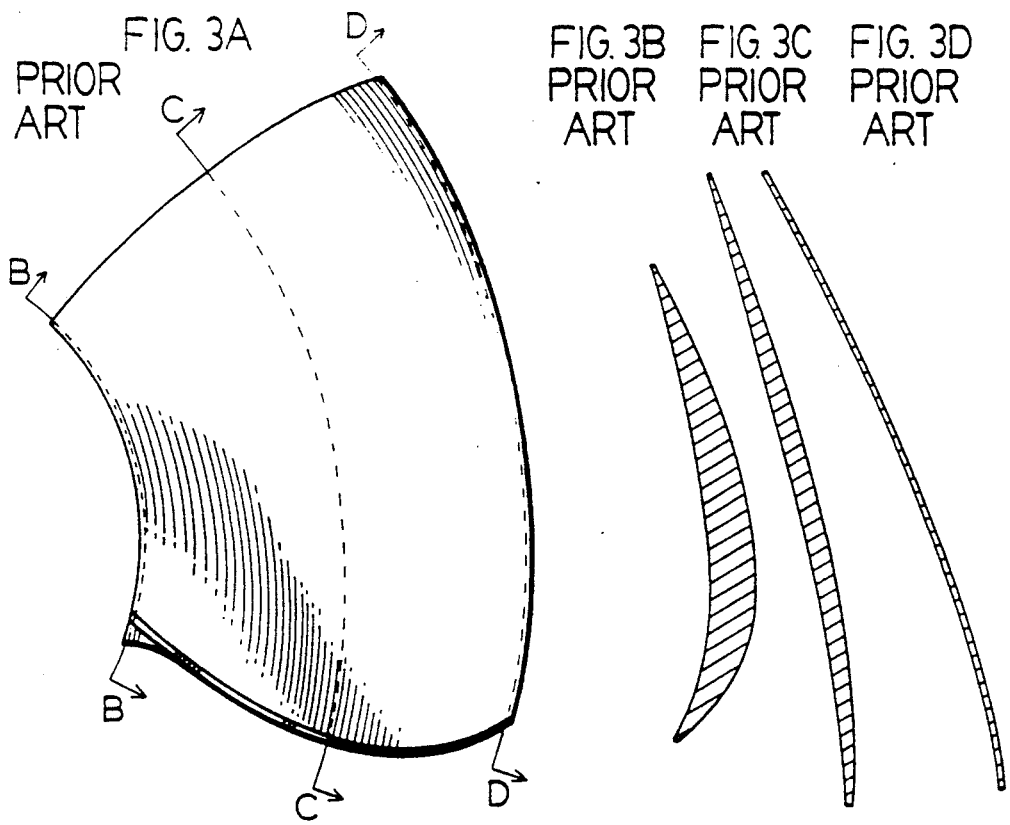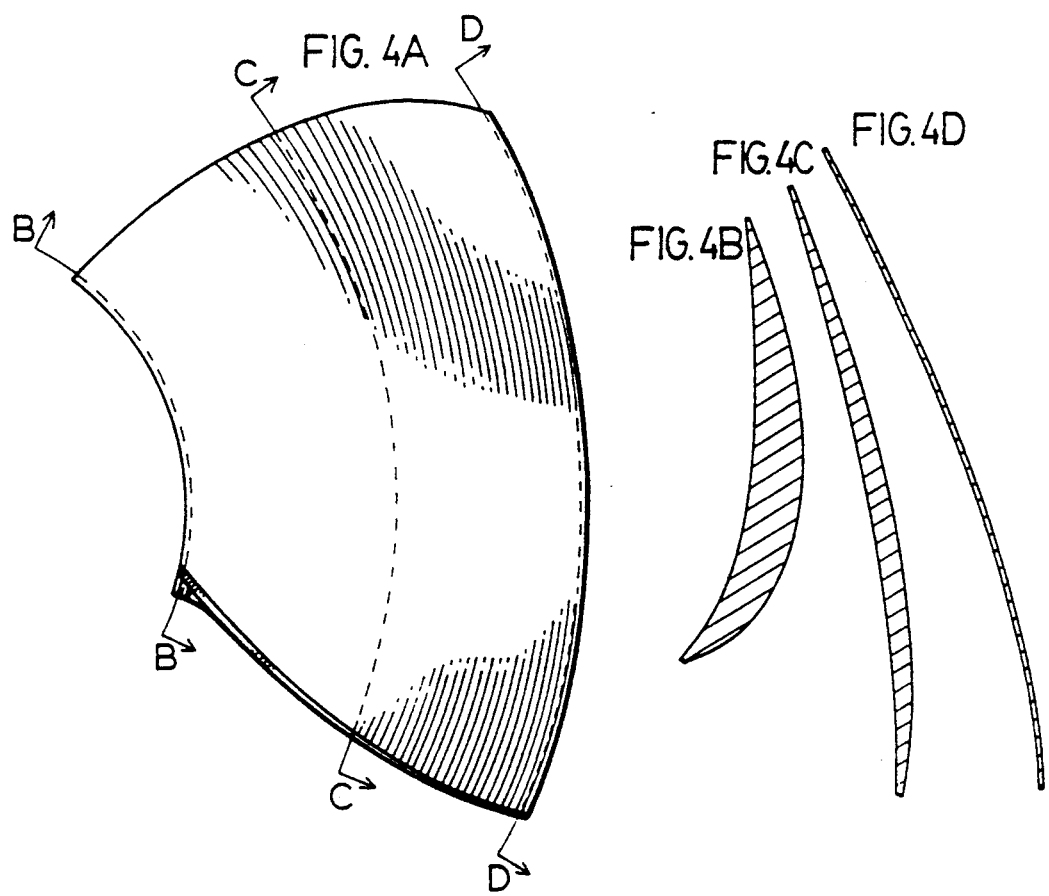

PROPELLER BLADE CONFIGURATION

This invention relates to a runner for a water turbine which is generically classified as a propeller type turbine runner, i.e. a runner having a diameter generally greater than 10 feet.

Propeller turbine runners generally find applications in power generation situations where low head, high volume water conditions are present. The runner of the present invention will be found suitable for application in large hydro power generation installations and as such will rotate at a constant speed (optimum design) but will respond to environments where a constant speed is not a condition of operation.

When designing a runner of this type, the designer is faced with optimizing several conditions.

The extraction of power from the water supply requires that the moving water be deflected by the runner blades in such a manner as to produce a force which results in drive torque. At the same time, a drag force is also produced which tends to reduce the drive torque. An optimum design of the blade shape, and pitch etc would seem to be an exercise in optimization in maximizing the force which results in producing drive torque, while minimizing the force which produces drag, but such is not the case. A phenomenon known as "cavitation" must also be dealt with by the runner designer because the design which may produce maximum output power may be destroyed quickly by the erosion of runner blades by cavitation. Cavitation appears to result when the blade foil deflects the moving water in such a manner as to produce velocity differences which produces pressure differentials in the water which are sufficient to produce pressure levels so low that bubbles of water vapour are produced in the low pressure areas (generally at the suction side of the blade). As the water at low pressure moves through the runner, the pressure will be increased and the bubbles of water vapour collapse. If the bubbles of water vapour collapse or implode in areas spaced some distance from the surface of the runner blades little or no damage seems to result, however if the implosion of the water vapour occurs at the surface of the runner blades, serious erosion of the blade surfaces will certainly result.

The designer is thus faced with another design criteria, to produce a minimum of cavitation erosion of the runner blade surfaces, while producing maximum output torque.

I have been able to produce an extremely efficient propeller type runner which has a minimum of erosion produced by cavitation by altering the blade profile to a shape which has a forward or leading edge of the blade which "leans" forward from the hub in the direction of rotation.

BRIEF DESCRIPTION OF THE DRAWINGS

FIG. 3A is a plan view of an individual PRIOR ART blade.

FIGS. 3B-3D are sectional views of FIG. 3A.

FIG. 4A is a plan view of a blade of the instant invention.

FIGS. 4B-4D are sectional Views of FIG. 4A.

DESCRIPTION OF THE PREFERRED EMBODIMENT

Figure 1:
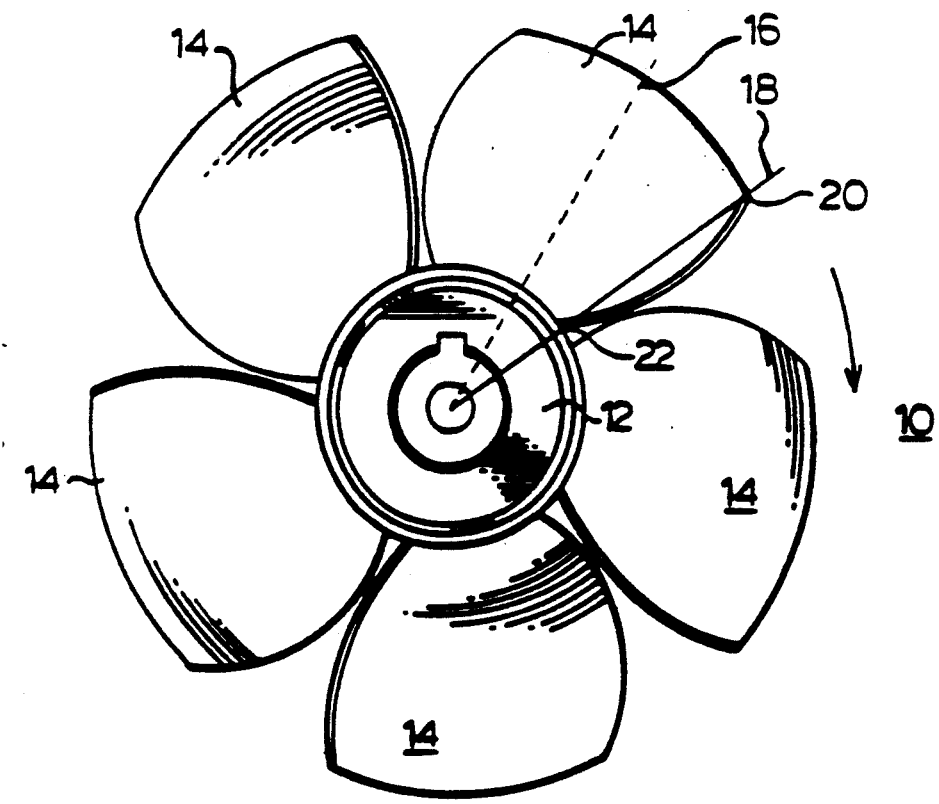
FIG. 1 is a propeller runner used in PRIOR ART applications.

Referring now to the Figures and FIG. 1 in particular it will be seen that FIG. 1 is a plan view of a runner 10 of PRIOR ART propeller turbine used for extracting energy from a water stream.

Runner 10 is composed of hub 12 surrounded by blades 14. An axis 16 is shown for one of the blades 14. A blade axis is located at the approximate geometric centre line around which the foil shape of the blade is designed. It may also be used by the designer as the preferred axis of twist, to provide a reference axis for changing the angle of twist of the blade during the design stage.

A second line 18 is shown on blade 14 which passes through the outer periphery 20 of the tip of the leading edge of blade 14. Note that line 18 also passes through a point 22 where blade 14 is attached to the hub (leading edge).

Figure 2:
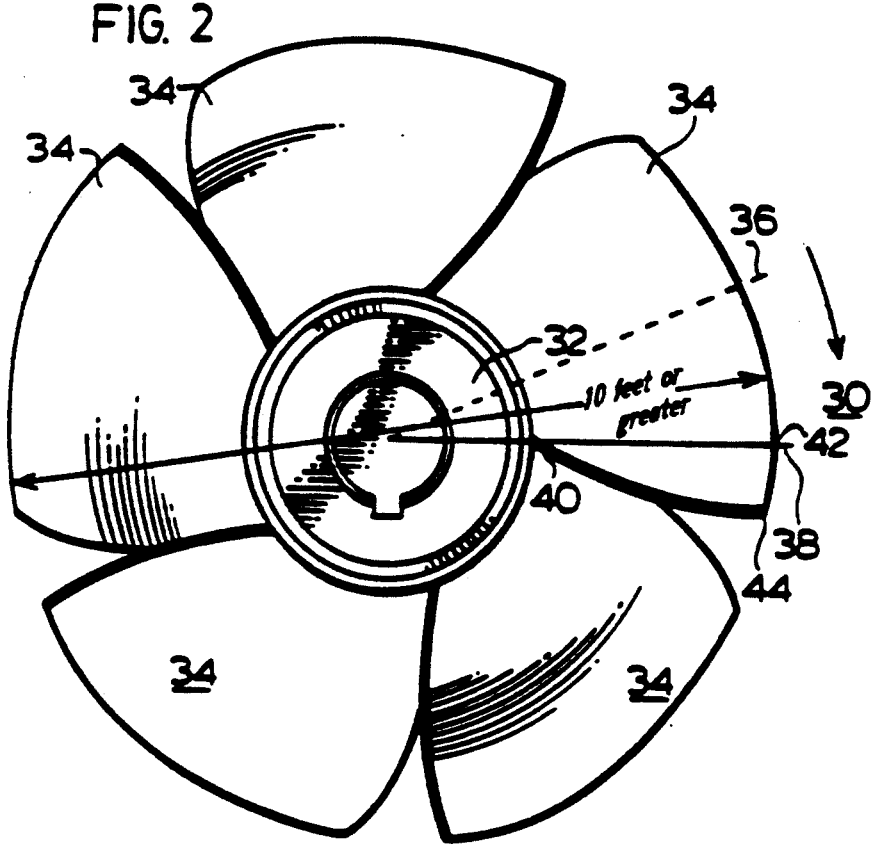
FIG. 2 is a propeller runner which is utilized in the present invention.

Referring now to FIG. 2 wherein the improved runner 30 of my invention is illustrated, it will immediately be seen that the blade configuration is substantially different than the prior art. Runner 30 comprises a hub 32 surrounded by blades 34. Blade 34 is shown having a blade axis 36. Also shown is line 38 which corresponds with line 18 of FIG. 1, line 38 intersection points 40 and 42 at the hub and blade periphery respectively. It will be seen that a substantial portion of blade 36 extends forward beyond line 38 in such a manner that a substantial portion of the trailing edge of the preceding blade is obscured (approximately 10 percent). The lead angle of the forward edge of the blade is such that about 1/7th of the blade (at the periphery) leans ahead of line 38. This means that this portion of the blade which did not exist in prior art designs is now available to extract energy from the moving water stream. It is not entirely understood how the shape and twist of the blades of the runner influences efficiency or the production of cavitation in the final runner design, but the runner of FIG. 2 produces superior torque and a minimum of cavitation. It would appear that the extraction of energy from the moving water column is more evenly distributed across the blade and hence the widely differing water pressures experienced in prior art designs are not present in this blade configuration.

A more specific pictorial description of the prior art blade and the new improved blade is given in FIGS. 3 and 4. Note that although the curvature is slightly different, the main departure in the two designs resides in the present of the extra "lean" of the improved blade which extends the blade forward in the direction of rotation.

Figure 6:
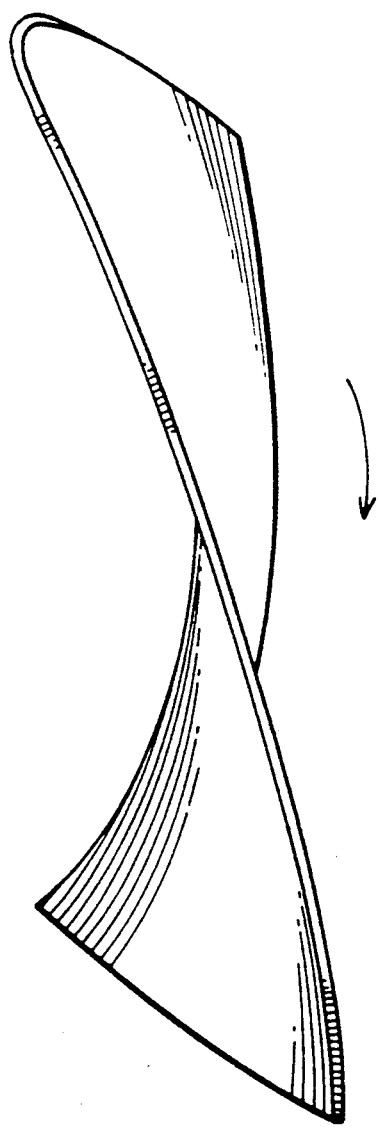
FIG. 6 is a view of the blade of the instant invention looking radially inwardly toward the hub along the blade axis.
Figure 5:
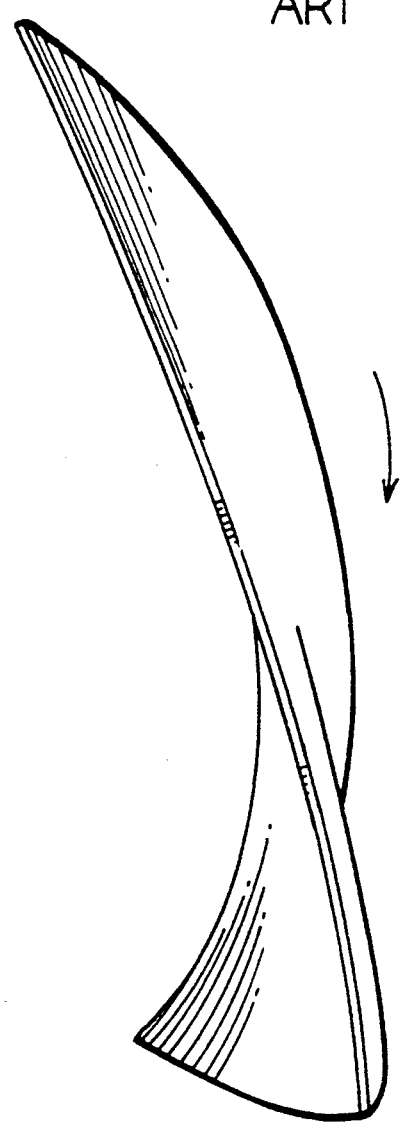
FIG. 5 is a view of a PRIOR ART blade taken looking inwardly toward the hub along the blade axis.

The twist and radial curvature of the improved blade and the prior art blade are not exactly the same in that the prior art blade has slightly more radial curvature at the leading edge than the improved blade which tends to have the leading and trailing edges more closely approximating a straight line. For this reason when looking radially inwardly along the blade axis of FIG. 6 the whole of the high pressure surface adjacent the leading edge is open to view. This is not true of the prior art design. Both the blades present much the same view however when viewing the trailing edge of the blade looking inwardly along the blade axis in FIGS. 5 and 6; that is the entire suction side adjacent the trailing edge of the blade is available for viewing.

The runner of the present design is a five blade design, but the invention is equally valid for blade configurations using more or less than five blades on a hub.

It is not entirely understood why the blade of this device exhibits the desirable qualities of superior performance and little or no cavitation, but because of the extra blade area produced by the forward "lean" of the improved blade, the energy extraction from the moving water stream is probably more gradual than the prior art blade. It will also be seen that the "extra" area of the improved blade tends to be located in an area overlapping the trailing edge of the blade immediately preceding it on the hub. This may provide a more evenly distributed pressure profile of the water between the trailing edge of the preceding blade and the leading edge of the blade following.

The runner of the present design is a five blade design but it will be obvious to those skilled in this art that the number of blades required for each design will be governed by the head and volume of water available for each application in which the blade design is to be applied.

It will be evident that the overlap of blades will be greater than that shown in the figures accompanying this application if the number of blades in a particular design embodying this invention is greater than five.

Similarly if the water head and volume available necessitate the use of blades less than five, there may be less or no overlap of the blades at all even though the degree of "lean" on the leading edge of the blade is kept at the same value as described for the five blades of this invention.

I claim:

1. A propeller type runner having a diameter of at least ten feet for the extraction of energy from a moving water stream for use in a low head hydro power generation applications comprising a symmetrical fan type configuration having two to five blades mounted on a hub wherein each blade of said propeller type runner has a leading edge which has a substantial forward skew to produce a lean in the direction of rotation of said runner, said forward skew serving to reduce the cavitation effects on said runner by reducing localized water pressure gradients existing across the surface of said blades.

2. A propeller type runner having a diameter of at least ten feet for use in a low head hydro power generation applications comprising a hub surrounded by at least two and not more than five blades in a multi-bladed symmetrical arrangement for extraction of power from a moving water stream, the shape of each blade being such that a radial line drawn from the axis of the propeller through the point where the leading edge of each blade joins the hub intersects the periphery of each blade at a point rearwardly from the leading blade tip at the periphery of said blade.

3. A runner as claimed in claim 2 in which the distance between the point on the periphery where the intersection of said radial line intersects and the leading peripheral blade tip equals substantially fifteen percent of the peripheral dimension of said blade.

4. A propeller type runner having a diameter of at least ten feet for use in a low head hydro power generation applications, comprising a central hub to which at least two and no more than five blades are attached in a fan configuration, the blades being symmetrical and of such shape that the leading edge of each blade has a substantial forward skew to produce a lean which obscures at least ten percent of the trailing edge of the preceding blade when viewed in an axial direction from the upstream side of the propeller turbine.

5. A propeller turbine as claimed in claim 4 in which substantially 60% of the trailing edge is obscured.

6. A propeller type runner having a diameter of at least ten feet for the extraction of energy from a moving water stream for use in a low head hydro power generation applications comprising a multi-bladed fan configuration wherein each blade of said propeller type runner has at least ten percent of the blade surface lying ahead of a line passing through a point where the leading edge of each blade intersects the hub of each blade and the propeller axis.

* * * * *